United States Patent
Kaindl

(10) Patent No.: US 11,240,667 B2
(45) Date of Patent: Feb. 1, 2022

(54) TELEPHONY CONTROL DEVICE, MEANS OF LOCOMOTION AND METHOD FOR OPERATING A MOBILE RADIO MODULE FOR A MEANS OF LOCOMOTION

(71) Applicant: Bayerische Motoren Werke Aktiengesellschaft, Munich (DE)

(72) Inventor: Markus Kaindl, Neubiberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/432,021

(22) Filed: Jun. 5, 2019

(65) Prior Publication Data

US 2019/0289551 A1 Sep. 19, 2019

Related U.S. Application Data

(63) Continuation of application No. PCT/EP2017/081441, filed on Dec. 5, 2017.

(30) Foreign Application Priority Data

Dec. 6, 2016 (DE) ..................... 10 2016 224 256.3

(51) Int. Cl.
*H04W 12/08* (2021.01)
*H04B 1/40* (2015.01)
*H04W 52/02* (2009.01)
*H04W 76/30* (2018.01)

(52) U.S. Cl.
CPC .............. *H04W 12/08* (2013.01); *H04B 1/40* (2013.01); *H04W 52/0216* (2013.01); *H04W 52/0229* (2013.01); *H04W 76/30* (2018.02); *Y02D 30/70* (2020.08)

(58) Field of Classification Search
CPC ................................................ G07C 5/00–12
See application file for complete search history.

(56) References Cited

U.S. PATENT DOCUMENTS

| | | | | |
|---|---|---|---|---|
| 5,276,728 A | * | 1/1994 | Pagliaroli | B60R 25/04 180/287 |
| 5,818,915 A | * | 10/1998 | Hayes, Jr. | H04M 1/0287 455/405 |
| 7,173,528 B1 | * | 2/2007 | Stewart | G06K 19/07345 340/10.1 |

(Continued)

FOREIGN PATENT DOCUMENTS

| CA | 2 821 197 A1 | 1/2015 |
|---|---|---|
| DE | 10 2004 049 297 A1 | 4/2006 |

(Continued)

OTHER PUBLICATIONS

PCT/EP2017/081441, International Search Report dated Feb. 5, 2018 (Three (3) pages).

(Continued)

*Primary Examiner* — Gennadiy Tsvey
(74) *Attorney, Agent, or Firm* — Crowell & Moring LLP

(57) ABSTRACT

A method for operating a mobile radio module of a telephony controller for a means of transport includes receiving a predefined deactivation command using the telephony controller via a wireless interface. In response thereto, the method also includes deactivating the mobile radio module.

5 Claims, 1 Drawing Sheet

(56) References Cited

U.S. PATENT DOCUMENTS

| | | | |
|---|---|---|---|
| 7,940,073 B1* | 5/2011 | Stewart | G06F 21/35 326/8 |
| 2004/0123128 A1* | 6/2004 | Morcel | H04N 7/165 713/193 |
| 2005/0208933 A1 | 9/2005 | Hospes | |
| 2007/0185728 A1* | 8/2007 | Schwarz | G06Q 40/12 701/36 |
| 2007/0277230 A1* | 11/2007 | Hawkins | G06F 7/58 726/4 |
| 2008/0219122 A1* | 9/2008 | Detzler | G06F 21/60 369/83 |
| 2009/0153311 A1* | 6/2009 | Lee | B60R 25/2018 340/426.1 |
| 2009/0187314 A1* | 7/2009 | Kitamura | B60R 16/0231 701/45 |
| 2010/0311466 A1* | 12/2010 | Wilson | H04B 5/00 455/557 |
| 2010/0332744 A1* | 12/2010 | Khosravi | G06F 21/6218 711/112 |
| 2011/0002295 A1* | 1/2011 | Ghosal | H04W 36/0055 370/331 |
| 2011/0107406 A1* | 5/2011 | Frost | G06F 9/45558 726/6 |
| 2012/0162423 A1 | 6/2012 | Xiao et al. | |
| 2012/0254290 A1* | 10/2012 | Naaman | G06Q 20/367 709/203 |
| 2013/0009460 A1* | 1/2013 | Speach | B60R 11/02 307/9.1 |
| 2013/0204821 A1* | 8/2013 | Keith, Jr. | G06F 11/26 706/46 |
| 2013/0254831 A1* | 9/2013 | Roach | H04L 63/20 726/1 |
| 2014/0199965 A1* | 7/2014 | Cepuran | H04W 12/08 455/411 |
| 2014/0199989 A1* | 7/2014 | Cepuran | H04W 48/16 455/422.1 |
| 2014/0222282 A1* | 8/2014 | Pauli | B60S 5/00 701/32.6 |
| 2014/0278475 A1* | 9/2014 | Tran | G16H 80/00 705/2 |
| 2015/0066287 A1 | 3/2015 | Daoud et al. | |
| 2015/0194803 A1* | 7/2015 | Valette | H02H 3/202 307/9.1 |
| 2016/0173474 A1* | 6/2016 | Nystrom | H04L 67/125 726/4 |
| 2017/0063996 A1* | 3/2017 | Kaster | H04L 63/1425 |
| 2017/0084169 A1* | 3/2017 | Sinaguinan | G08C 17/02 |
| 2017/0123925 A1* | 5/2017 | Patnaik | G06F 21/577 |
| 2017/0164267 A1* | 6/2017 | Marka | H04W 52/0251 |
| 2018/0005230 A1* | 1/2018 | Zovi | G06Q 20/02 |

FOREIGN PATENT DOCUMENTS

| | | | | |
|---|---|---|---|---|
| DE | 10 2010 052 812 A1 | 6/2011 | | |
| DE | 10 2013 006 927 A1 | 10/2014 | | |
| WO | WO-2010151102 A1 | * | 12/2010 | H04W 12/082 |

OTHER PUBLICATIONS

German Search Report issued in German counterpart application No. 10 2016 224 256.3 dated Aug. 10, 2017, with Statement of Relevancy (Nine (9) pages).

* cited by examiner

TELEPHONY CONTROL DEVICE, MEANS OF LOCOMOTION AND METHOD FOR OPERATING A MOBILE RADIO MODULE FOR A MEANS OF LOCOMOTION

CROSS REFERENCE TO RELATED APPLICATIONS

This application is a continuation of PCT International Application No. PCT/EP2017/081441, filed Dec. 5, 2017, which claims priority under 35 U.S.C. § 119 from German Patent Application No. 10 2016 224 256.3, filed Dec. 6, 2016, the entire disclosures of which are herein expressly incorporated by reference.

BACKGROUND AND SUMMARY OF THE INVENTION

The present invention relates to a telephony controller, to a means of transport and to a method for operating a mobile radio module of a telephony controller for a means of transport. The present invention relates in particular to preventing unauthorized access to the on-board data network of the means of transport.

Vehicles linked in a data network have a telematics controller with a mobile radio module. Data communication connections for a wide variety of purposes are able to be maintained via the mobile radio module. By way of example, the software of controllers, their parameterization ("coding") and their firmware may be updated and modified via wireless communication connections. A mobile radio contract normally exists for the contract term of telecommunications services that are linked to a means of transport. To close off security loopholes or for functional updates, there are methods for updating the controller software via the mobile radio data interface to a mobile radio network.

The software of the telematics controller/of the modem firmware of the mobile radio module has to be continuously checked for security loopholes that have become known. The security loopholes are able to be closed off "over the air" in the telematics controller/mobile radio modem by way of hotfixes. Maintenance has to be performed over the entire life cycle of the vehicle in order to ensure that the vehicle is secured against external attacks (for example from the Internet). It is not ensured that this requirement is able to be achieved over the entire life cycle of the vehicle (for example the performance of the built-in hardware is not sufficient for software updates/new security fixes (also "security algorithms"), sub-suppliers stop support for the built-in components, or the like). Ending the services and deactivating the SIM card is not sufficient. The mobile radio modem also subsequently still attempts to log into the mobile radio network and is therefore still susceptible to unauthorized data connections (also "man-in-the-middle" attacks) to mobile base stations. In summary, there is a security risk for the data infrastructure of the means of transport in the event that security precautions are not maintained as required.

One object of the present invention is to satisfy the requirement for data security identified above.

The object identified above is achieved according to the invention by a method for operating a mobile radio module of a telephony controller for a means of transport or for protecting same against an unauthorized data connection. The telephony controller may also be understood to mean a data communication controller or data communication gateway. It is thus capable of operating at least the mobile radio module or of comprising same. The telephony controller may furthermore comprise an application processor (for example for an emergency call function) and a module for satellite-based location. The mobile radio module is configured so as to maintain a wireless communication connection for the exchange of data between the means of transport and a telecommunications infrastructure (for example a terrestrial mobile radio network, WLAN access point or the like). The means of transport is configured so as, via the mobile radio module or the telephony controller, to manage the data communication, for example for updates of controllers (for example navigation system, access authorization checking systems, etc.). The means of transport itself may be designed for example as an automobile, transporter, truck, motorcycle, aircraft and/or watercraft. In a first step, a predefined deactivation command is received by way of the telephony controller via a wireless interface. The deactivation command may be transmitted for example at the end of a period within which security updates are provided for the mobile radio module. It may be prompted for example by the operator and/or manufacturer of the means of transport. The manufacturer of the mobile radio module and/or of the telephony controller may in particular declare that maintenance, within the meaning of security-relevant update measures, has been stopped. The deactivation command should in particular not be understood just to be a "power off" event, but rather triggers a predefined routine. In order to prevent authorized access to the data infrastructure of the means of transport in spite of the communication hardware, which is functional as before, the mobile radio module may be deactivated in response to the reception of the deactivation command. In this case, the mobile radio module may essentially be definitively taken out of service. In other words, care is taken to ensure that the possibility of unauthorized data access no longer exists. This may in particular also comprise a step by way of which, by modifying hardware and/or software, a situation is henceforth prevented whereby a data communication connection is possible in both directions ("uplink" and "downlink") by way of the mobile radio module. As a result, updates to the security software of the means of transport are largely redundant, since it is no longer possible to establish a wireless data connection for unauthorized persons/entities. As a result, the means of transport is able to be securely operated in a continuous manner, including after a period of regularly updated security updates.

In order to prevent a situation whereby the deactivation command is generated by an unauthorized person (for example with malicious intent) or accidentally and received by the means of transport, the deactivation of the mobile radio module may take place a successful comparison between the received deactivation command and a predefined reference kept in the means of transport. It should be checked in this case that the sender of the deactivation command is trusted and the vehicle (on its own) is selected/designated as the recipient of the deactivation command. The predefined reference may also be received via a wired and/or wireless data communication connection and be compared with the deactivation command in the means of transport. It is obvious to a person skilled in the art that the deactivation command may be contained in a data packet whose integrity is able to be checked with the predefined reference in another way in order to ensure that the deactivation command is actually intended for the present means of transport.

The deactivation of the mobile radio module may comprise a permanent interruption of a supply of electric power to the mobile radio module. As a result, (unauthorized) use of the mobile radio module is permanently and reliably prevented.

Accordingly, a supply of electric power to the telephony controller may be permanently interrupted in response to the deactivation command, which telephony controller, for its part, supplies electric power to the mobile radio module. As a result, in this embodiment as well, the mobile radio module is taken out of service and protected against unauthorized use.

The wireless interface may be configured for example so as to maintain a terrestrial mobile data communication connection with a cell-based, terrestrial or satellite-based radio network/wireless data communication system. In some cases, it may be necessary to re-establish the function of the telephony controller and/or of the mobile radio module. By way of example, a security update may unexpectedly become available or secure operation of the telephony controller/of the mobile radio module may be ensured by way of other measures. It may additionally be possible for the deactivation command, in spite of all precautionary measures, to have been given unintentionally or for other circumstances to have contributed to a situation whereby the deactivation of the mobile radio module should be reversed. To this end, a predefined reactivation command may be received by the means of transport or by the telephony controller and/or by the mobile radio module. This may take place for example via a diagnostic socket (for example OBD, OBD2 or the like). A wired connection may thus in particular be a prerequisite for giving and receiving the reactivation command and using it to reactivate the mobile radio module. The mobile radio module may be reactivated in response to the reception of the predefined reactivation command. Following this, the software/parameterization of the mobile radio module may be updated and the operation of the mobile radio module may be securely continued, as before the deactivation.

The reactivation may also take place in response to a positive comparison of the predefined reactivation command with a predefined reference. This may essentially take place according to the predefined reference described above in connection with the deactivation command.

The deactivation of the mobile radio module may take place for example by addressing a fuse that is part of a data connection between the mobile radio module and its peripheral. In other words, the fuse may have an electrical signal applied to it such that said signal melts the fuse. In this way, a galvanic connection of the mobile radio module and/or of the telephony controller is permanently and in particular irreversibly destroyed. To address the fuse, said fuse may have a voltage applied to it, for example via a switch/transistor, which voltage results in current intensities through the fuse that are beyond a response current.

According to a second aspect of the present invention, a telephony controller for a means of transport is proposed that comprises a mobile radio module and a data input. The data input is configured so as to receive a predefined command via a wireless communication interface. The predefined command may be designed as a deactivation command, in response to the reception of which the telephony controller is configured so as to deactivate the mobile radio module. The deactivation command should in particular not be understood to be such a command that is given at the end of each operating cycle (for example after removal of an ignition key or parking of the means of transport), but rather is essentially received once at the end of a lifetime of the mobile radio module and is used for deactivation thereof. In this way, the telephony controller according to the invention is configured so as to execute a method according to the first-mentioned aspect of the invention. Reference is therefore made to the above explanations in respect of the features, combinations of features and the advantages resulting therefrom in order to avoid repetitions.

According to a third aspect of the present invention, a means of transport is proposed, which may be designed for example as an automobile, transporter, truck, motorcycle, aircraft and/or watercraft. The means of transport comprises at least one telephony controller according to the second-mentioned aspect of the invention. In this way, the means of transport according to the invention is also configured so as to accordingly implement the features, combinations of features and advantages of the abovementioned aspects of the invention, for which reason reference is made to the above explanations in order to avoid repetitions.

In addition, the advantages targeted by the present invention may also be achieved as follows: after the service provision has ended, a final shutdown command is transmitted from the back-end of an operator and/or manufacturer of the means of transport to the means of transport. The reception leads to the voltage supply of the mobile radio module being permanently switched off. As a result, the mobile radio module is no longer able to attempt to log into the mobile radio network. By way of example, the mobile radio module may be put back into service by a protected diagnostic command. This may be protected by a signature, for example. In particular, the diagnostic command may be made via a diagnostic interface for reactivating the mobile radio module in the means of transport. This may take place by way of example via a wired data connection in a trade organization/branch of the manufacturer of the means of transport. By way of example, an erroneously transmitted deactivation command/shutdown command may make it necessary to reactivate the mobile radio module.

Security of the vehicle against external hacker attacks (that is to say via a mobile radio interface) is thus ensured, even after the CD services have ended and product support through security "hotfixes" has ended.

Further details, features and advantages of the invention become apparent from the following description and the figures.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
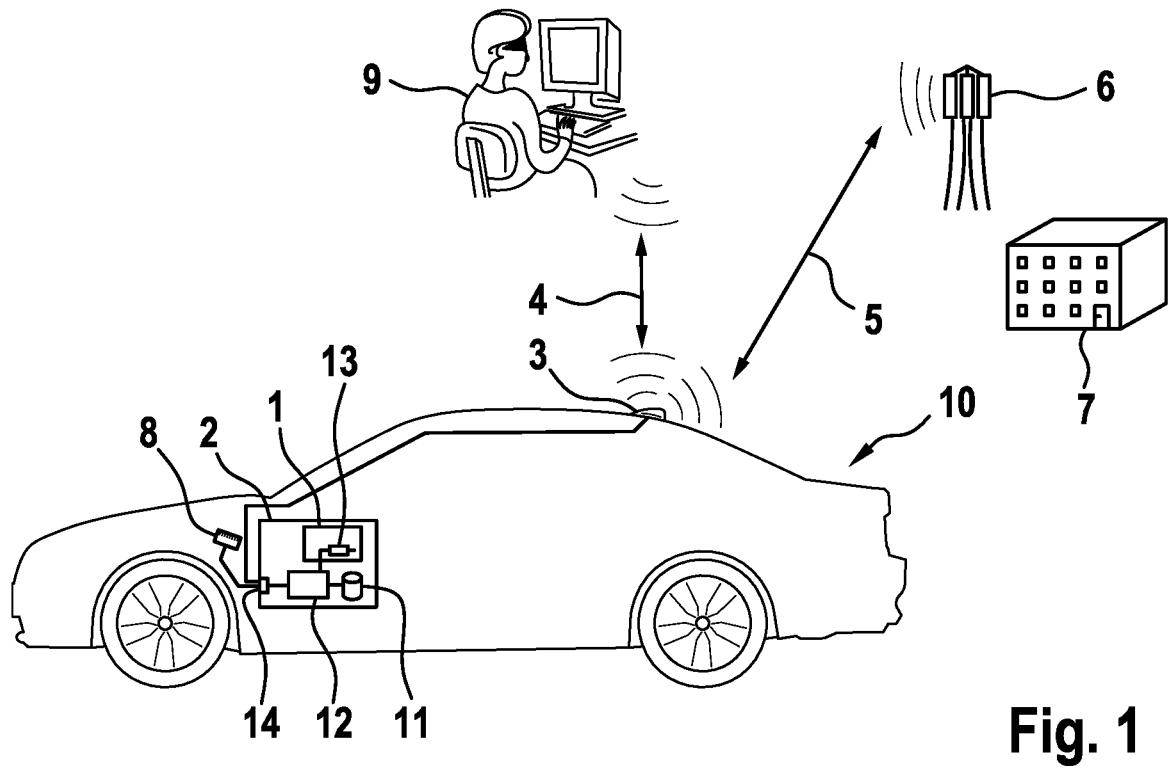
FIG. 1 shows a schematic illustration of an interaction of an exemplary embodiment of a means of transport according to the invention with an exemplary embodiment of a telephony controller according to the invention with a wireless infrastructure.

FIG. 1 shows an automobile 10 as an exemplary embodiment of a means of transport according to the invention with a telephony controller 2, which comprises a data input 14, an evaluation unit 12, a data memory 11 and a mobile radio module 1. The data input 14 is configured so as to receive wireless communication signals received from an antenna 3 and diagnostic commands received from an OBD socket 8. The evaluation unit 12 is configured so as to execute the steps of a method according to the invention for deactivating the mobile radio module 1. To this end, corresponding steps in data form and predefined references for identifying deactivation commands and reactivation commands are stored in the data memory 11. A fuse 13 for securing a supply of power to the mobile radio module 1 is provided inside the mobile radio module 1. The evaluation unit 12 is configured so as to address the fuse 13 as soon as a positively checked deactivation command from the manufacturer 7 of the automobile 10 is received by way of a transmission mast 6 via an authorized wireless communication connection 5. As a result, the mobile radio module 1 is taken out of service. A hacker 9 is therefore no longer capable of establishing an unauthorized wireless communication connection 4 to the automobile 10. In the event that the deactivation command has been erroneously transmitted to the automobile 10, the manufacturer 7 of the automobile 10 is able to establish an authorized wired communication connection with the automobile 10 by way of a diagnostic command in order to allow the telephony controller 2 to receive a reactivation command. In response to a positive comparison of the reactivation command with a reference value stored in the data memory 11, the telephony controller 2, by way of the evaluation unit 12, puts the mobile radio module 1 back into operation by providing an alternative supply of power (not illustrated) for the mobile radio module 1. As an alternative or in addition, the manufacturer 7 of the automobile 10 may allow the user of the automobile 10 to receive a message, via the authorized wireless communication connection 5, that it is necessary to visit a branch in order to reactivate the mobile radio module 1, in order to establish a wired data connection using the OBD socket 8 and to give the reactivation command in order to put the mobile radio module 1 back into service.

Figure 2:
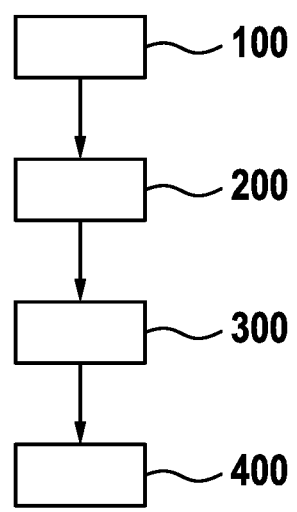
FIG. 2 shows a flowchart illustrating steps of an exemplary embodiment of a method according to the invention for operating a mobile radio module.

FIG. 2 shows steps of an exemplary embodiment of a method according to the invention for protecting a mobile radio module of a telephony controller of a means of transport against an unauthorized data connection. In step 100, a predefined deactivation command is received by way of the telephony controller via a wireless interface. In response thereto, the mobile radio module is permanently deactivated in step 200. In step 300, a predefined reactivation command is received via a diagnostic socket. The background of this is that the previously received deactivation command was not intended for the means of transport. In step 400, the mobile radio module is finally permanently reactivated, and the previously received deactivation command is thus essentially undone.

LIST OF REFERENCE SIGNS

1 mobile radio module
2 telephony controller
3 antenna
4 unauthorized wireless communication connection
5 authorized wireless communication connection
6 transmission mast
7 vehicle manufacturer
8 OBD socket
9 hacker
10 automobile
11 data memory
12 evaluation unit
13 fuse
14 data input
100 to 400 method steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a mobile radio module of a telephony controller of a means of transport, wherein the means of transport is configured so as, via the mobile radio module, to manage data communication for a data infrastructure of the means of transport, comprising the acts of:
   receiving a predefined deactivation command using the telephony controller via a wireless interface from a manufacturer of the means of transport, wherein the predefined deactivation command is received at an end of a period within which security updates are provided for the mobile radio module and when security update measures for the mobile radio module are no longer available after the period, and
   deactivating the mobile radio module by permanently interrupting a supply of electric power to the mobile radio module in response to the receiving of the predefined deactivation command and, by the deactivating, preventing unauthorized data access to the data infrastructure of the means of transport.

2. The method according to claim 1, wherein deactivating the mobile radio module comprises deactivating the mobile radio module in response to a positive comparison of the predefined deactivation command with a predefined reference.

3. The method according to claim 1, wherein the wireless interface uses a terrestrial mobile data communication connection.

4. The method according to claim 1, wherein the permanently interrupting the supply of electric power to the mobile radio module comprises melting a fuse in the mobile radio module in response to the reception of the predefined deactivation command.

5. A means of transport, comprising:
   a data infrastructure; and
   a telephony controller with a data input and a mobile radio module;
   wherein the means of transport is configured so as, via the mobile radio module, to manage data communication for the data infrastructure of the means of transport;
   wherein the data input is configured to receive a predefined deactivation command via a wireless interface from a manufacturer of the means of transport at an end of a period within which security updates are provided for the mobile radio module and when security update measures for the mobile radio module are no longer available after the period, and
   wherein the telephony controller is configured to deactivate the mobile radio module by permanently interrupting a supply of electric power to the mobile radio module in response to the reception of the deactivation command and, by the deactivation, prevent unauthorized data access to the data infrastructure of the means of transport.

\* \* \* \* \*